United States Patent
Doi et al.

(10) Patent No.: US 9,459,437 B2
(45) Date of Patent: Oct. 4, 2016

(54) SURGICAL MICROSCOPE SYSTEM

(71) Applicant: MITAKA KOHKI CO., LTD., Tokyo (JP)

(72) Inventors: Masao Doi, Tokyo (JP); Toshio Yamazaki, Tokyo (JP)

(73) Assignee: MITAKA KOHKI CO., LTD., Tokyo (JP)

( * ) Notice: Subject to any disclaimer, the term of this patent is extended or adjusted under 35 U.S.C. 154(b) by 24 days.

(21) Appl. No.: 14/189,132

(22) Filed: Feb. 25, 2014

(65) Prior Publication Data

US 2014/0247482 A1 Sep. 4, 2014

(30) Foreign Application Priority Data

Mar. 4, 2013 (JP) .................. 2013-041415

(51) Int. Cl.
G02B 21/20 (2006.01)
G02B 21/00 (2006.01)
G02B 21/22 (2006.01)
G02B 21/36 (2006.01)

(52) U.S. Cl.
CPC ........... *G02B 21/0012* (2013.01); *G02B 21/22* (2013.01); *G02B 21/361* (2013.01)

(58) Field of Classification Search
CPC ...... G02B 21/18; G02B 21/20; G02B 21/22; G02B 21/00; G02B 21/025; G02B 21/06; G02B 21/365; G02B 21/367; G02B 21/362; A61B 90/50; A61B 3/13; A61B 3/145
USPC ................................. 359/368–398
See application file for complete search history.

(56) References Cited

U.S. PATENT DOCUMENTS

| | | | | |
|---|---|---|---|---|
| 5,299,053 A * | 3/1994 | Kleinburg | ............. | G02B 21/06 351/201 |
| 8,270,073 B2 | 9/2012 | Nakamura et al. | | |
| 2001/0003490 A1 * | 6/2001 | Kawasaki | ............. | G02B 21/06 359/385 |
| 2009/0116102 A1 * | 5/2009 | Higuchi | ............. | G02B 21/0012 359/377 |
| 2009/0190209 A1 | 7/2009 | Nakamura | | |
| 2011/0032335 A1 * | 2/2011 | Sander | ................ | G02B 21/025 348/46 |
| 2011/0134518 A1 | 6/2011 | Doi et al. | | |
| 2012/0056996 A1 * | 3/2012 | Sander et al. | .................. | 348/47 |
| 2012/0147460 A1 * | 6/2012 | Kubler | ..................... | A61B 3/13 359/389 |
| 2013/0100271 A1 * | 4/2013 | Howes | ................. | H04N 5/2251 348/78 |
| 2013/0222897 A1 * | 8/2013 | Yamazaki | ............. | G02B 21/22 359/376 |
| 2014/0211304 A1 * | 7/2014 | Nakamura | ............. | G02B 21/22 359/363 |

FOREIGN PATENT DOCUMENTS

JP  2004-320722  11/2004

OTHER PUBLICATIONS

U.S. Appl. No. 14/228,688 to Katsuyuki Nakamura et al., which was filed on Mar. 28, 2014.
U.S. Appl. No. 14/165,837 to Katsuyuki Nakamura et al., which was filed on Jan. 28, 2014.

* cited by examiner

*Primary Examiner* — Bumsuk Won
*Assistant Examiner* — Jeffrey Madonna
(74) *Attorney, Agent, or Firm* — Greenblum & Bernstein, P.L.C.

(57) ABSTRACT

A surgical microscope system includes a camera 9 that is turnable around an optical axis K of the camera 9 to optionally select a photographing orientation. The camera 9 is able to pick up an electronic image of an affected part T in an orientation in which a main doctor sees the affected part T, or in an orientation in which an assistant, who is present at a different position from the main doctor, sees the affected part T, or in any other orientation. The electronic image picked up by the camera 9 in a selected orientation is stereoscopically observable with an electronic image display unit 2.

7 Claims, 3 Drawing Sheets

SURGICAL MICROSCOPE SYSTEM

BACKGROUND OF THE INVENTION

1. Field of the Invention

The present invention relates to a surgical microscope system.

2. Description of Related Art

Japanese Unexamined Patent Application Publication No. 2004-320722, for example, discloses a surgical microscope system that includes a stand, a surgical microscope vertically and movably supported on the stand, a camera installed on the surgical microscope to pick up a pair of electronic images having binocular parallax so that the images are stereoscopically viewable, and an electronic image display unit having a pair of left and right display panels to display the electronic images, respectively, so that an observer who watches the display panels with his or her left and right eyes is able to stereoscopically observe the images.

SUMMARY OF THE INVENTION

According to the related art, the camera is immovable, and therefore, is able to pick up images only in a predetermined orientation. Namely, the related art is unable to take images of an object in an optional orientation according to, for example, the orientation of a main doctor who observes the object with the surgical microscope or the orientation of an assistant who observes the object with the electronic image display unit.

In consideration of the inconvenience of the related art, the present invention provides a surgical microscope system capable of optionally setting an orientation in which a camera picks up images of an object.

According to an aspect of the present invention, the surgical microscope system includes a surgical microscope that has an objective optical system, two main optical paths to guide a pair of left and right beams from the objective optical system to left and right eyepieces, and an optical branching unit to partly branch the pair of left and right beams of the main optical paths into secondary optical paths, a camera that is installed on the surgical microscope so that the secondary optical paths pass through the camera and has a pair of left and right imaging elements to pick up electronic images from the beams of the secondary optical paths, and an electronic image display unit that has a pair of left and right display panels to display the electronic images provided by the camera and a pair of eyepieces through which an observer is able to observe the displayed electronic images with his or her eyes. The camera is configured to be turnable around an optical axis of the camera extending along the secondary optical paths.

DESCRIPTION OF PREFERRED EMBODIMENTS

Figure 1:
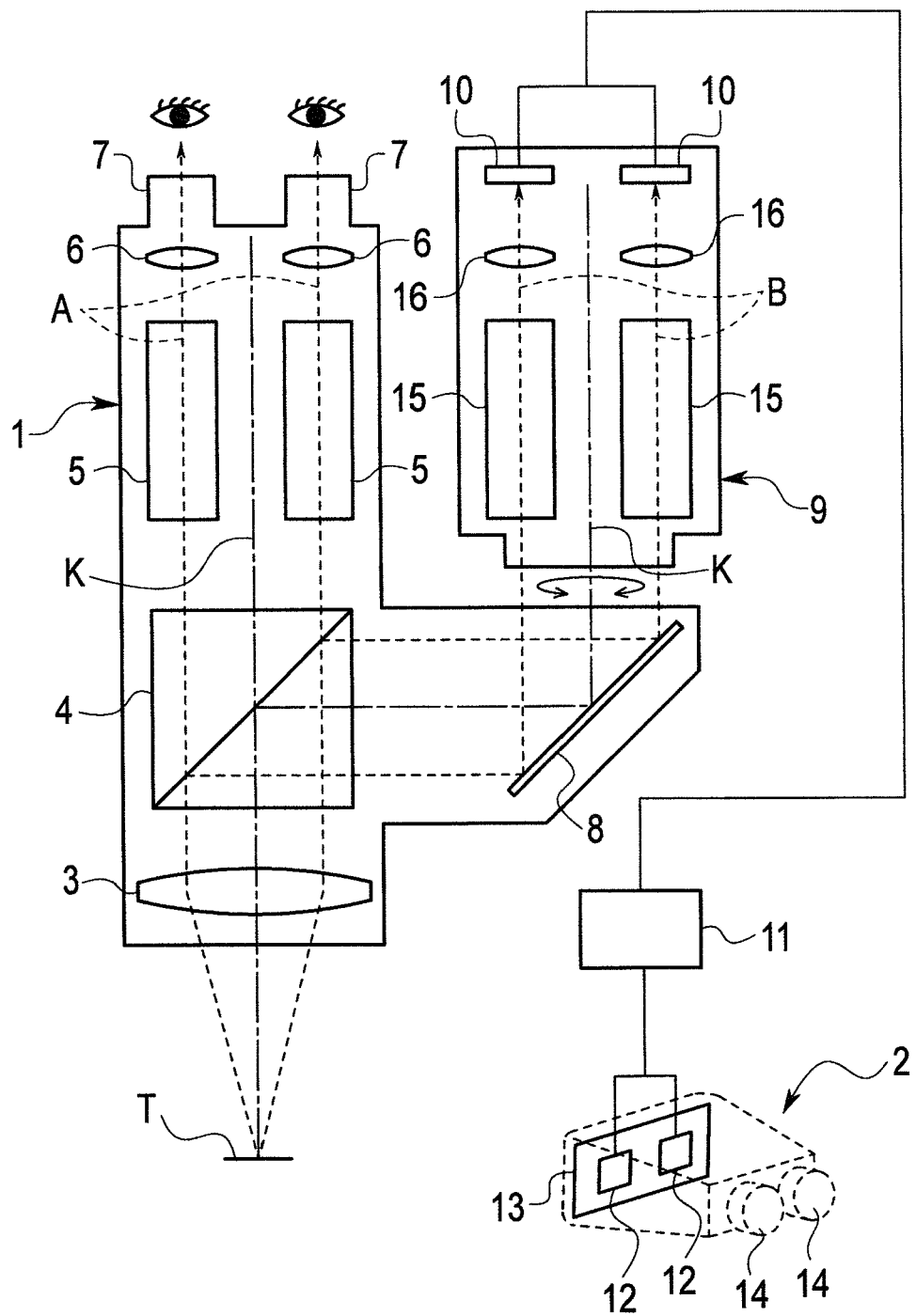
FIG. 1 is a side view illustrating a surgical microscope system according to an embodiment of the present invention.
Figure 2:
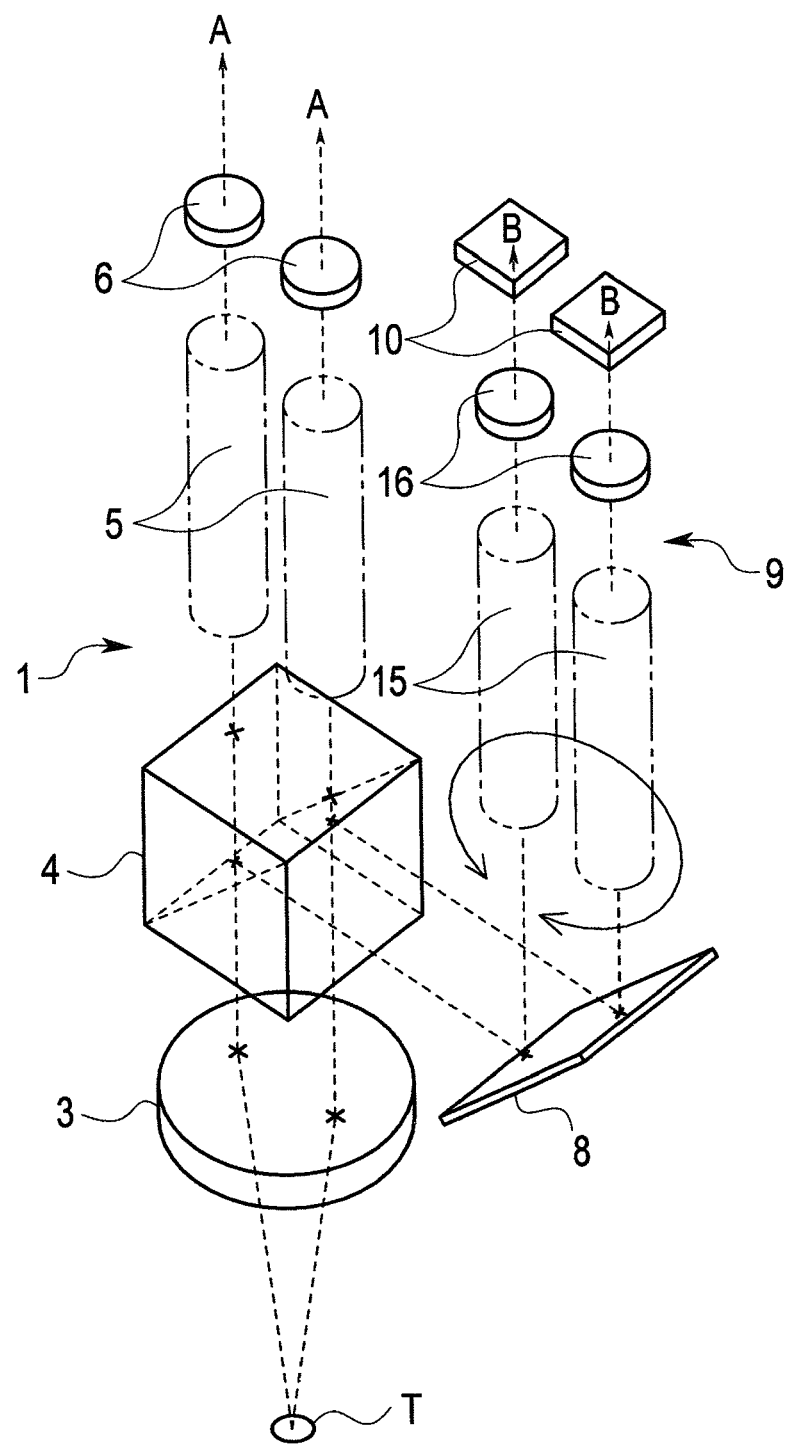
FIG. 2 is a perspective view illustrating components of the surgical microscope system.

A surgical microscope system according to an embodiment of the present invention will be explained with reference to the drawings.

The surgical microscope system includes a surgical microscope 1, a camera 9, and an electronic image display unit 2. The surgical microscope 1 is supported at a front end of a support arm (not illustrated) horizontally extending from a stand (not illustrated) that is arranged in, for example, an operating room. The electronic image display unit 2 is also supported with the support arm, and in the present embodiment, is positioned on the right side of the surgical microscope 1. The camera 9 is installed on the surgical microscope 1.

The surgical microscope 1 has a pair of left and right main optical paths A to realize a stereoscopic observation. Arranged at a lower part of the surgical microscope 1 is an objective optical system 3. Arranged above the objective optical system 3 is a beam splitter 4 that is the optical branching unit stipulated in the claims. And arranged above the beam splitter 4 are a pair of left and right variable power optical systems 5. The main optical paths A are defined to pass through the pair of left and right variable power optical system 5 and imaging lenses 6 to eyepieces 7.

The beam splitter 4 partly branches the main optical paths A in a right-angle direction into secondary optical paths B. The secondary optical paths B are reflected by a mirror 8 into a direction parallel to the main optical paths A and are guided into the camera 9 installed on the surgical microscope 1.

The camera 9 incorporates a pair of left and right two-dimensional CCD image sensors (hereinafter referred to as CCDs) 10 that are the image sensors stipulated in the claims. The secondary optical paths B pass through variable power optical systems 15 and imaging lenses 16 to the CCDs 10, which provide a pair of electronic images having binocular parallax.

The electronic images provided by the CCDs 10 of the camera 9 are transferred through a controller 11 to the electronic image display unit 2. According to the present embodiment, the secondary optical paths B are once reflected by the mirror 8 and guided into the camera 9, and therefore, the camera 9 is able to pick up erected images. Accordingly, the electronic images provided by the camera 9 are not needed to be inverted in the controller 11. Since the camera 9 always receives erected images, the camera 9 is able to always provide erected stereoscopic images even if the camera 9 is turned at an optional angle around an optical axis K of the camera 9 extending along the secondary optical paths B. This eliminates a need to process the electronic images in the controller 11, simplifies the controller 11, improves reliability, and reduces costs. The beam splitter 4 and mirror 8 may be integrated into one.

The electronic image display unit 2 incorporates a pair of left and right display panels 12 that are organic electroluminescent panels and are arranged on a substrate 13 that receives signals from the controller 11. Arranged opposite to the display panels 12 in the display unit 2 are a pair of left and right eyepieces 14. The display panels 12 display the electronic images having binocular parallax, and therefore, an assistant who is at the display unit 2 is able to three-dimensionally observe the electronic images through the eyepieces 14. As mentioned above, the display unit 2 handled by the assistant is on the right side of the surgical microscope 1 handled by a main doctor and is angled at 90 degrees relative to the surgical microscope 1. Watching the display unit 2, the assistant must help the main doctor who operates an affected part T of a patient with the use of the surgical microscope 1.

For this, the camera 9 is configured to be optionally turnable around the optical axis K at the position where the camera 9 is installed on the surgical microscope 1. The camera 9 is configured to receive a predetermined frictional force when turned so that the camera 9 may stop at an optional turned position on the surgical microscope 1.

Figure 3:
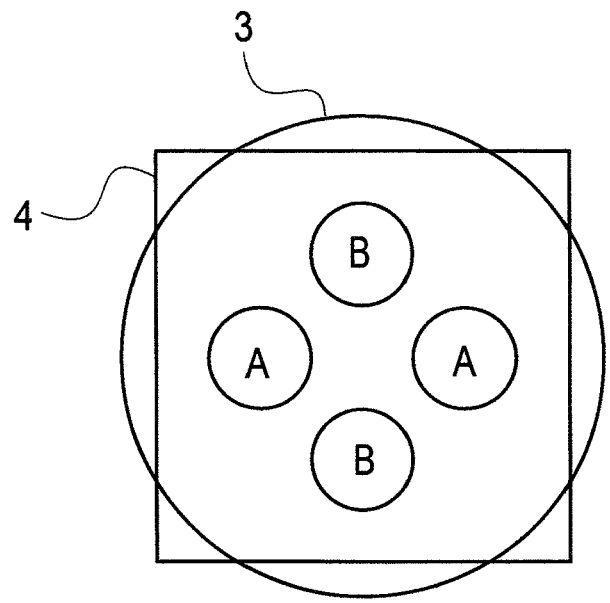
FIG. 3 is a view illustrating main optical paths and secondary optical paths in the surgical microscope system, the secondary optical paths being turned by 90 degrees relative to the main optical paths.

When the camera 9 is turned about the optical axis K, the orientation of a plane that contains the secondary optical paths B in the camera 9 changes relative to the mirror 8, i.e., relative to a plane that contains the main optical paths A in the surgical microscope 1. For example, the camera 9 may be turned as illustrated in FIG. 3 so that the plane that contains the secondary optical paths B forms an angle of 90 degrees with respect to the plane that contains the main optical paths A. In this case, the orientational relationship of 90 degrees between the plane that contains the secondary optical paths B and the plane that contains the main optical paths A agrees with the orientational relationship of 90 degrees between the electronic image display unit 2 and the surgical microscope 1. Namely, an image of the affected part T displayed on the display unit 2 and stereoscopically observed by the assistant agrees is oriented in just the direction in which the assistant actually faces the affected part T.

The surgical microscope 1 and camera 9 commonly use an optical axis of the objective optical system 3 and beam splitter 4. The camera 9, however, is turnable to select an orientation of the secondary optical paths B independently of the main optical paths A of the surgical microscope 1. Accordingly, the camera 9 is able to always provide erected three-dimensional images whenever the camera 9 is turned at an optional angle.

Figure 4:
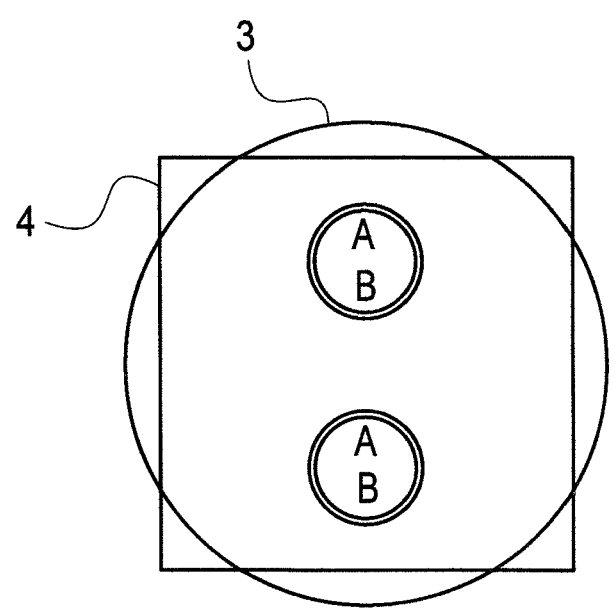
FIG. 4 is a view illustrating the main and secondary optical paths brought into agreement with each other in the surgical microscope system.

When the camera 9 is turned so that the plane that contains the secondary optical paths B agrees with the plane that contains the main optical paths A as illustrated in FIG. 4, the assistant observes an electronic image of the affected part T on the electronic image display unit 2 in the same direction in which the main doctor observes the affected part T on the surgical microscope 1.

The assistant, therefore, is able to three-dimensionally observe the affected part T on the electronic image display unit 2 in the direction in which the assistant faces the actual affected part T, or in the direction in which the main doctor faces the actual affected part T, or in any other direction. The embodiment realizes this optional directivity without inverting or turning images in the controller 11, thereby simplifying circuits of the controller 11. The controller 11 is able to directly output image data from the camera 9 to the display unit 2, thereby improving reliability and lowering costs.

According to the invention, the camera 9 is turnable around an optical axis of the camera 9, and therefore, is able to optionally select the orientation of an image to pick up. Namely, the camera 9 is able to pick up an image of the affected part T oriented in a direction in which the main doctor sees the actual affected part T, or in a direction in which the assistant, who is present at a different position from the main doctor, sees the actual affected part T, or in any other direction. Then, an electronic image of the affected part T of the selected orientation is stereoscopically observable on the electronic image display unit 2.

Two light beams to be made incident along the secondary optical paths B to the camera 9 are once reflected by the mirror (reflector) 8 so that the camera 9 may provide erected images. This eliminates a need for inverting, in the controller 11, electronic images transferred from the camera 9 to the electronic image display unit 2.

This patent application claims the benefit of priority under 35 U.S.C. 119(a) to Japanese Patent Application No. 2013-041415 filed on Mar. 4, 2013 whose disclosed contents are incorporated by reference herein.

What is claimed is:

1. A surgical microscope system, comprising:
a surgical microscope having an objective optical system, two main optical paths defined to guide a pair of left and right beams from the objective optical system to left and right eyepieces, and an optical branch partly branching the pair of left and right beams of the main optical paths into a secondary optical paths;
a camera installed on the surgical microscope so that the secondary optical paths pass through the camera and having a pair of left and right image sensors to pick up electronic images from the beams of the secondary optical paths; and
an electronic image display having a pair of left and right display panels to display the electronic images provided by the camera and a pair of eyepieces through which an observer is able to observe the displayed electronic images with his or her eyes, wherein
the camera is configured to be turnable around an optical axis of the camera extending along the secondary optical paths.

2. The surgical microscope system of claim 1, further comprising an optical reflector once reflecting the secondary optical paths and then introducing them into the camera.

3. The surgical microscope system of claim 1, wherein the camera is turnable independently of the main optical paths.

4. The surgical microscope system of claim 1, wherein the secondary optical paths are reflected directly into the camera.

5. The surgical microscope system of claim 1, wherein the optical branch includes a splitter and a mirror which partly branch and reflect the main optical paths directly into the camera as the secondary optical paths.

6. The surgical microscope system of claim 1, wherein the camera is configured to display the electronic images in a same direction as the surgical microscope.

7. The surgical microscope system of claim 1, wherein the camera is configured to receive a predetermined frictional force when turned and to stop at a predetermined turned position.

* * * * *